(12) United States Patent
Zhang (10) Patent No.: US 8,863,157 B2
(45) Date of Patent: Oct. 14, 2014

(54) METHOD, DEVICE, AND MOBILE TERMINAL FOR API INTERCEPTION

(71) Applicant: Tencent Technology (Shenzhen) Company Limited, Shenzhen (CN)

(72) Inventor: Lichun Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/063,908

(22) Filed: Oct. 25, 2013

(65) Prior Publication Data

US 2014/0053167 A1    Feb. 20, 2014

Related U.S. Application Data

(63) Continuation of application No. PCT/CN2013/079600, filed on Jul. 18, 2013.

(30) Foreign Application Priority Data

Jul. 20, 2012 (CN) .......................... 2012 1 0252551

(51) Int. Cl.
*G06F 13/00* (2006.01)
*G06F 9/48* (2006.01)
*G06F 9/44* (2006.01)
*G06F 9/455* (2006.01)

(52) U.S. Cl.
CPC ............... *G06F 9/4843* (2013.01); *G06F 9/44* (2013.01); *G06F 9/45533* (2013.01); *G06F 9/45558* (2013.01); *G06F 2009/45591* (2013.01)

USPC .............................................. 719/328; 718/1

(58) Field of Classification Search
CPC ............................ G06F 9/45533; G06F 9/541
USPC .............................................. 719/328; 718/1
See application file for complete search history.

(56) References Cited

U.S. PATENT DOCUMENTS 5,974,549 A * 10/1999 Golan ............................. 726/23
8,204,911 B2 * 6/2012 Neil ............................... 707/793
8,490,070 B2 * 7/2013 Diez et al. ..................... 717/147

* cited by examiner

*Primary Examiner* — Andy Ho
(74) *Attorney, Agent, or Firm* — Morgan, Lewis & Bockius LLP (57) ABSTRACT

The present invention discloses an application programming interface interception method and device, and a mobile terminal. The method includes: monitoring, based on a process identifier of an API process, the API process in a virtual machine corresponding to a system in real time; when the API process is activated, obtaining a virtual machine instance corresponding to the API process from a memory according to the process identifier; according to identifier information of an API to be intercepted, replacing an address pointing to the code of a first API written in a first computer language corresponding to the API process with a stored address pointing to the code of a second API (or a replacement function) corresponding to the first API and written in a second computer language different from the first language; and implementing control on the API process through a second API function.

20 Claims, 4 Drawing Sheets

METHOD, DEVICE, AND MOBILE TERMINAL FOR API INTERCEPTION

RELATED APPLICATION

This application is a continuation application of PCT Patent Application No. PCT/CN2013/079600, entitled "METHOD, DEVICE, AND MOBILE TERMINAL FOR API INTERCEPTION," filed on Jul. 18, 2013, which claims priority to Chinese Patent Application No. 201210252551.8, entitled "METHOD, DEVICE, AND MOBILE TERMINAL FOR API INTERCEPTION," filed on Jul. 20, 2012, both of which are incorporated by reference in their entirety.

TECHNICAL FIELD

The disclosed implementations relate generally to the field of mobile terminals, and in particular, to an application programming interface (API) interception method and device, and a mobile terminal.

BACKGROUND

With the rapid development of an Android (Android) system, more and more terminals use the Android system. The Android system is a system of open source codes. An application may be installed in a terminal that uses the Android system, and the Android system provides a running environment for the application.

Currently, when a vendor manufactures a terminal that uses the Android system, an application may be directly built in that terminal. A user may also install other applications in a terminal according to a need of the user. These applications are all provided by corresponding vendors, and after each application is developed, a function of each application is fixed and the function of the application cannot be extended or modified.

SUMMARY

In order to extend or modify a function of an application, the present invention provides a function interception method and device. The technical solutions are described as follows:

An application programming interface (API) interception method is provided, where the method includes:
 monitoring, based on a process identifier of an API process, the API process in a virtual machine corresponding to a system in real time;
 when the API process is activated, obtaining a virtual machine instance corresponding to the API process from a memory according to the process identifier of the API process;
 according to identifier information of an API to be intercepted, replacing a address of a first API and written in a first computer language with a stored address of a second API written in a second computer language, and corresponding to the first API from the virtual machine instance corresponding to the API process, where the second language is different from the first language; and implementing control on the API process through a second function.

The step of monitoring, based on a process identifier of an API process, the API process in a virtual machine corresponding to a system in real time includes: when it is detected that the virtual machine corresponding to the system starts to run the API process corresponding to the process identifier of the API process, detecting that the API process is activated.

The identifier information of the API to be intercepted at least includes a class identifier of a class to which the API to be intercepted belongs and a function identifier of the function of the API to be intercepted.

The step of according to identifier information of an API to be intercepted, replacing a address of a first API and written in a first computer language with a stored address of a second API (or a replacement function) written in a second computer language and corresponding to the first API from the virtual machine instance corresponding to the API process includes: obtaining, according to the class identifier, a class structure corresponding to a class to which the first API belongs from the virtual machine instance corresponding to the API process; obtaining a function structure corresponding to the first API from the class structure according to a function identifier of the first API; and replacing the address of the first API that is stored in the function structure with the stored address of the second API (or the replacement function).

The second computer language is a C language or a C++ language.

An application programming interface (API) interception device is provided, where the device includes: a monitor module, configured to monitor, based on a process identifier of an API process, the API process in a virtual machine corresponding to a system in real time; an obtaining module, configured to: when the API process is activated, obtain a virtual machine instance corresponding to the API process from a memory according to the process identifier of the API process; and an replacement module, configured to: according to identifier information of an API to be intercepted, replace a address of a first API and written in a first computer language with a stored address of a second API (or a replacement function) written in a second computer language and corresponding to the first API from the virtual machine instance corresponding to the API process, where the second language is different from the first language; and implement control on the API process through a second function.

The monitor module is specifically configured to: when it is detected that the virtual machine corresponding to the system starts to run the API process corresponding to the process identifier of the API process, detect if the API process is activated.

The identifier information of the API to be intercepted at least includes a class identifier of a class to which the API to be intercepted belongs and a function identifier of the function of the API to be intercepted.

The replacement module includes: a first obtaining unit, configured to obtain, according to the class identifier, a class structure corresponding to a class to which the first API belongs from the virtual machine instance corresponding to the API process; a second obtaining unit, configured to obtain a function structure corresponding to the first API from the class structure according to a function identifier of the first API; and a replacement unit, configured to replace the address of the first API that is stored in the function structure with the stored address of the second API (or the replacement function).

In the embodiments of the present invention, the API process is monitored, according to the process identifier of the API process, in the virtual machine corresponding to the system in real time; if it is detected that the API process is activated, the virtual machine instance corresponding to the API process is obtained from the memory according to the process identifier of the API process; and according to identifier information of the first API, a address of a function to be intercepted is replaced with the stored address corresponding to the second API (or the replacement function) from the virtual machine instance corresponding to the API process, so as to intercept the API.

In accordance with some embodiments, an application programming interface (API) interception method performed at a mobile communication terminal having one or more processors and memory for storing one or more programs to be executed by the one or more processors, comprises: monitoring the status of a process of an API in a virtual machine based on a process identifier of the API; when the process of the API is activated, obtaining a virtual machine instance corresponding to the process of the API from the memory based on the process identifier of the API; identifying a first address of a function of the API in the virtual machine instance based on the process identifier of the API; replacing the first address with a second address of a replacement function, wherein the API is written in a first computer language and the replacement function is written in a second computer language; and executing the replacement function.

In accordance with some embodiments, a mobile device, comprises: a processor; memory; and one or more programs stored in the memory and to be executed by the processor, the one or more programs including instructions for: monitoring the status of a process of an API in a virtual machine based on a process identifier of the API; when the process of the API is activated, obtaining a virtual machine instance corresponding to the process of the API from the memory based on the process identifier of the API; identifying a first address of a function of the API in the virtual machine instance based on the process identifier of the API; replacing the first address with a second address of a replacement function, wherein the API is written in a first computer language and the replacement function is written in a second computer language; and executing the replacement function.

In accordance with some embodiments, a handheld computer, comprises: one or more processors; and memory storing one or more programs, wherein the one or more programs, when executed by the one or processors, cause the handheld computer to: monitor the status of a process of an API in a virtual machine based on a process identifier of the API; when the process of the API is activated, obtain a virtual machine instance corresponding to the API process from the memory based on the process identifier of the API; determine whether the API should be intercepted based on a first set of criteria stored in a database; if the API should be intercepted, select a replacement function based on a second set of criteria stored in the database; identifying a first address of a function of the API in the virtual machine instance based on the process identifier of the API; replacing the first address with a second address where the replacement function is located, wherein the API is written in a first computer language and the replacement function is written in a second computer language; and executing the replacement function.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

To make the objectives, technical solutions, and advantages of the present invention more comprehensible, the following further describes the embodiments of the present invention in detail with reference to the accompanying drawings.

An application run in an Android system includes one or more classes, and each class includes one or more APIs. A function implemented by the application may be divided into multiple steps, and each step is implemented by one or more APIs. An application in the Android system is run in a virtual machine corresponding to the Android system. When the application is activated, the Android system creates a process used to run the application, and establishes a virtual machine instance in a memory of a terminal for the process. The virtual machine instance is a structure, the virtual machine instance is identified by using a process identifier of the process, and the virtual machine instance at least includes a class structure corresponding to each class included in the application, and may further include a type of a parameter and the number of parameters included in the application. The class structure corresponding to each class is identified by using a class identifier of each class. For any class, a class structure corresponding to the class at least includes a function structure corresponding to each API included in the class. The function structure corresponding to each API is identified by using a function identifier of each API. For any API, a function structure corresponding to the API at least includes an address of the API. The address corresponds to a storage space, and the storage space is used to store a specific code implementing the API, and the storage space is a space on a magnetic disk at the terminal.

After the process is activated and a certain API needs to be run, the process obtains, according to a class identifier of a class to which the API belongs, a class structure corresponding to the class from a virtual machine instance corresponding to the process; obtains, according to a function identifier of the function of the API, a function structure corresponding to the API from the class structure corresponding to the class; obtains a address of the API from the function structure; and invokes, according to the address, a code implementing the API; and runs the code implementing the API, so as to run the API.

A function implemented by the application may be divided into multiple steps, and each step is implemented by one or more APIs. When the function of the application needs to be modified or extended, a certain step or some certain steps included in the application may be modified, so as to modify or extend the function of the application. These steps are implemented by a corresponding API, and the API implementing these steps is modified, so that these steps can be modified. For the convenience of illustration, the API implementing these steps is called a first API, and the first API is an AI written in a first computer language, where the first computer language may be a Java language.

In the embodiments, technical personnel may develop a second API (or a replacement function) in advance. The second API (or the replacement function) can implement a modified step. The replacement function can be an API or any other function that is developed to replace the first API or a function of the first API. Then, the first API, invoked by the process used to run the application, is intercepted through the method in the present invention, and the second API (or the replacement function) developed by the technical personnel is invoked by the process used to run the application, so as to modify or extend the function of the application. The second API (or the replacement function) is an API written in a second computer language, where the second computer language is a C language, a C++ language, or the like.

It should be noted that, a class included in an application run in the Android system may be a Java class, and an API included in the class may be a Java API.

Figure 1:
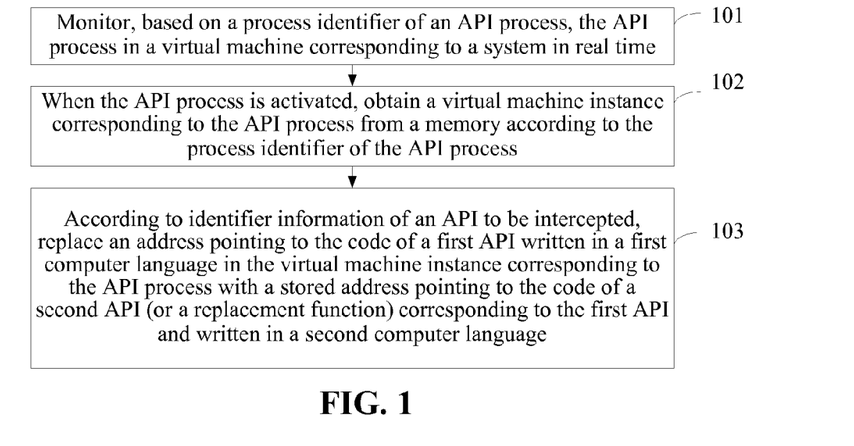
FIG. 1 is a flowchart of an API interception method in accordance with some embodiments.

FIG. 1 is a flowchart of an API interception method in accordance with some embodiments.

As shown in FIG. 1, an embodiment of the present invention provides a function interception method, which includes:

Step 101: Monitor, based on a process identifier of an API process, the API process in a virtual machine corresponding to a system in real time.

Step 102: When the API process is activated, obtain a virtual machine instance corresponding to the API process from a memory according to the process identifier of the API process.

Step 103: According to identifier information of an API to be intercepted, replace an address pointing to the code of a first API written in a first computer language in the virtual machine instance corresponding to the API process with a stored address pointing to the code of a second API (or a replacement function) corresponding to the first API and written in a second computer language, where the second language is different from the first language.

Control on the API process is implemented through the second function.

In the embodiment of the present invention, the API process is monitored, according to the process identifier of the API process, in the virtual machine corresponding to the system in real time; if it is detected that the API process is activated, the virtual machine instance corresponding to the API process is obtained from the memory according to the process identifier of the API process; and according to identifier information of the first API, a address of a function to be intercepted is replaced with the stored address corresponding to the second API (or the replacement function) from the virtual machine instance corresponding to the API process, so as to intercept the API.

Figure 2:
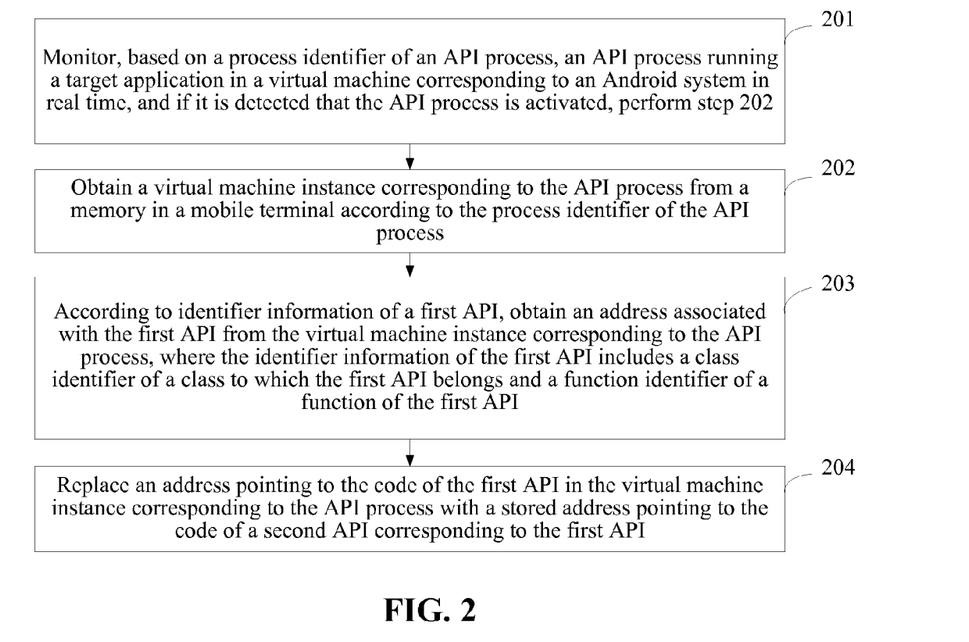
FIG. 2 is a flowchart of an API interception method in accordance with some embodiments.

FIG. 2 is a flowchart of an API interception method in accordance with some embodiments.

An embodiment of the present invention provides a function interception method.

A target application is an application on which function extension or function modification needs to be performed. A certain step or some certain steps included in the target application may be modified, so as to extend or modify a function of the target application. An API used to implement these steps is a first API. In addition, technical personnel develop a second API (or a replacement function) in advance. The second API (or the replacement function) is used to implement one or more modified steps. A function to be intercepted that is invoked by an API process used to run the target application is intercepted through the method provided in this embodiment, and the second API (or the replacement function) developed by the technical personnel in advance is invoked by the API process, so as to extend or modify the function of the target application. Referring to FIG. 2, the method includes:

Step 201: Monitor, based on a process identifier of an API process, an API process running a target application in a virtual machine corresponding to an Android system in real time, and if it is detected that the API process is activated, perform step 202.

An application in the Android system runs through the virtual machine corresponding to the Android system. When the target application is activated, the Android system creates an API process used to run the target application, and establishes a virtual machine instance for the API process. The virtual machine instance is a structure, the virtual machine instance is identified by using a process identifier of the API process, and the virtual machine instance corresponding to the API process at least includes a class structure corresponding to each class included in the target application. The class structure corresponding to each class is identified by using a class identifier of each class. For any class, a class structure corresponding to the class at least includes a function structure corresponding to each API included in the class. The function structure corresponding to each API is identified by using a function identifier of each API. For any API, a function structure corresponding to the API at least includes an address of the API. Then, the API process is activated, the API process is placed in the virtual machine corresponding to the Android system, and the virtual machine runs the API process.

The process identifier of the API process is configured by the technical personnel in advance, and the process identifier of the API process may be a name of the API process, where the name of the API process may be a name of the target application.

This step may specifically be: monitoring, according to the process identifier of the API process that is configured in advance, the virtual machine corresponding to the Android system in real time, and when it is detected that the virtual machine corresponding to the Android system starts to run the API process corresponding to the process identifier of the API process, detecting that the API process is activated.

For example, an application used for telephone call is an application provided by the Android system, and the application used for call includes two steps: first step, dialing according to a called number, and second step, connecting a calling party to a called party. The first step may be implemented by an API used to implement dialing, and the second step may be implemented by an API used to connect a call. In addition, it should be noted that, the application used for call includes a class used for call, where the class used for call includes the API used to implement dialing and the API used to connect a call.

It is assumed that, in this embodiment, a function implemented by the application used for call needs to be extended, so that when a user uses the application used for call to dial a called number, a geographical location of a called party can be displayed. Therefore, the application used for call is the target application, and the first step included in the target application needs to be modified, and the first API is the API used to implement dialing that implements the first step. The technical personnel develop a second API (or a replacement function) in advance. The second API (or the replacement function) is used to implement the modified first step, that is, the second API (or the replacement function) can display the geographical location of the called party when the called number is dialed.

When the target application in the Android system is activated, the Android system creates an API process used to run the target application, and establishes a virtual machine instance shown in Table 1 in a memory of a terminal for the API process. The virtual machine instance is identified by using a process identifier ProcessID1 of the API process, and the virtual machine instance includes a class structure corresponding to the class used for call. The class structure is identified by using a class identifier ClassID1 of the class used for call, and the class structure includes a function structure corresponding to the API used to implement dialing and a function structure corresponding to the API used to connect a call. The function structure corresponding to the API used to implement dialing is identified by using a function identifier FunctionID1 of the API used to implement dialing, and the function structure includes an address Address1 corresponding to the API used to implement dialing. The function structure corresponding to the API used to connect a call is identified by using a function identifier FunctionID2 of the API used to connect a call, and the function structure includes an address Address2 corresponding to the API used to connect a call.

TABLE 1

| Process identifier | Virtual machine instance | | |
|---|---|---|---|
| ProcessID1 | Class identifier | Class structure | |
| | ClassID1 | Function identifier | Function structure (specified address) |
| | | FunctionID1 | Address1 |
| | | FunctionID2 | Address2 |

The technical personnel develop a second API (or a replacement function) in advance, where an address of the second API (or the replacement function) is Address2. Correspondingly, the virtual machine corresponding to the Android system is monitored in real time according to the process identifier ProcessID1 of the API process, and when it is detected that the API process starts to be run in the virtual machine, it is determined that the API process is activated.

Step 202: Obtain a virtual machine instance corresponding to the API process from a memory in a mobile terminal according to the process identifier of the API process.

For example, the virtual machine instance corresponding to the API process and shown in Table 1 is obtained from the memory in the terminal according to the process identifier ProcessID1 of the API process.

Step 203: According to identifier information of a first API, obtain a address associated with the first API from the virtual machine instance corresponding to the API process, where the identifier information of the first API includes a class identifier of a class to which the first API belongs and a function identifier of a function of the first API.

The technical personnel configure in advance that the identifier information of the first API includes the class identifier of the class to which the first API belongs and the function identifier of the first API. Specifically, according to the class identifier of the class to which the first API belongs, a class structure corresponding to the class to which the first API belongs is obtained from the virtual machine instance corresponding to the API process, a function structure corresponding to the first API is obtained from the obtained class structure according to the function identifier of the first API, and the address corresponding to the first API is obtained from the function structure corresponding to the first API.

For example, in this embodiment, the technical personnel configure in advance that the identifier information of the first API includes the class identifier ClassID1 of the class to which the first API belongs and the function identifier FunctionID1 of the first API.

According to the class identifier ClassID1 of the class to which the first API belongs, the class structure corresponding to the class to which the first API belongs is obtained from the virtual machine instance corresponding to the API process and shown in Table 1, according to the function identifier FunctionID1 of the first API, the function structure corresponding to the first API is obtained from the class structure corresponding to the class to which the first API belongs, and Address1 corresponding to the first API is obtained from the function structure.

Step 204: Replace an address pointing to the code of the first API in the virtual machine instance corresponding to the API process with a stored address pointing to the code of a second API corresponding to the first API.

When the API process needs to run the first API, the code is obtained from the virtual machine instance according to the class identifier of the class to which the first API belongs and the function identifier of the first. The code then jumps to the address of the second API (or the replacement function). As a result, the API process invokes a code implementing the second API (or the replacement function) and runs the code implementing the second API (or the replacement function) according to its address, so as to modify or extend the target application.

For example, in the virtual machine instance corresponding to the API process and shown in Table 1, Address1 of the first API is replaced with Address2 of the second API (or the replacement function), so as to obtain a virtual machine instance corresponding to the API process and shown in Table 2.

TABLE 2

| Process identifier | Virtual machine instance | | |
|---|---|---|---|
| ProcessID1 | Class identifier | Class structure | |
| | ClassID1 | Function identifier | Function structure (specified address) |
| | | FunctionID1 | Address1 |
| | | FunctionID2 | Address2 |

When the API process needs to run the first API (or one of its functions) to be intercepted, the address obtained, according to the class identifier ClassID1 of the class to which the first API belongs and the function identifier FunctionID1 of the first API (or one of its functions) to be intercepted, from the virtual machine instance shown in Table 2 is Address1, so that the API process invokes the code implementing the second API (or the replacement function) and runs the code implementing the second API (or the replacement function) according to Address2, so as to display the geographical location of the called party when the called number is dialed.

In the embodiment of the present invention, the API process is monitored, according to the process identifier of the API process, in the virtual machine corresponding to the Android system in real time; if it is detected that the API process is activated, the virtual machine instance corresponding to the API process is obtained from the memory according to the process identifier of the API process; and according to the identifier information of the first API, the address of the first API is replaced with the stored address corresponding to the second API (or the replacement function) from the virtual machine instance corresponding to the API process, so as to intercept the first API. In this way, the API process used to run the target application invokes and runs the code implementing the second API (or the replacement function) according to the replaced address, and the second API (or the replacement function) is used to implement a function of modifying or extending the target application, so as to modify or extend the function of the target application.

Figure 3:
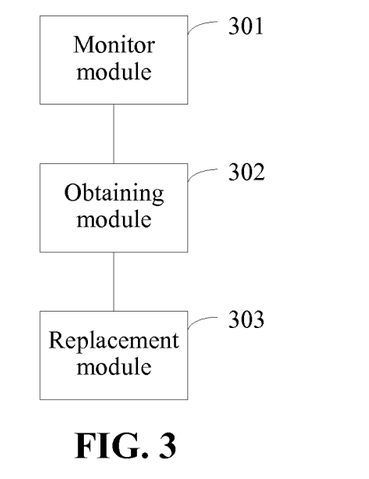
FIG. 3 is a schematic structural diagram of a first API interception device in accordance with some embodiments.

FIG. 3 is a schematic structural diagram of a first API interception device in accordance with some embodiments.

As shown in FIG. 3, an embodiment of the present invention provides an API interception device, which includes:

a monitor module 301, configured to monitor, based on a process identifier of an API process, the API process in a virtual machine corresponding to a system in real time;

an obtaining module 302, configured to: when the API process is activated, obtain a virtual machine instance corresponding to the API process from a memory according to the process identifier of the API process; and a replacement module 303, configured to: according to identifier information of an API to be intercepted, replace an address pointing to the code of a first API written in a first computer language in the virtual machine instance corresponding to the API process with a stored address pointing to the code of a second API (or a replacement function) corresponding to the first API and written in a second computer language, where the second language is different from the first language; and implement control on the API process through a second function.

The monitor module 301 is specifically configured to: upon detecting that the virtual machine starts to run an API process with the process identifier of the API, detect that the API process is activated.

The identifier information of the API to be intercepted at least includes a class identifier of a class to which the API to be intercepted belongs and a function identifier of the function of the API to be intercepted.

Figure 4:
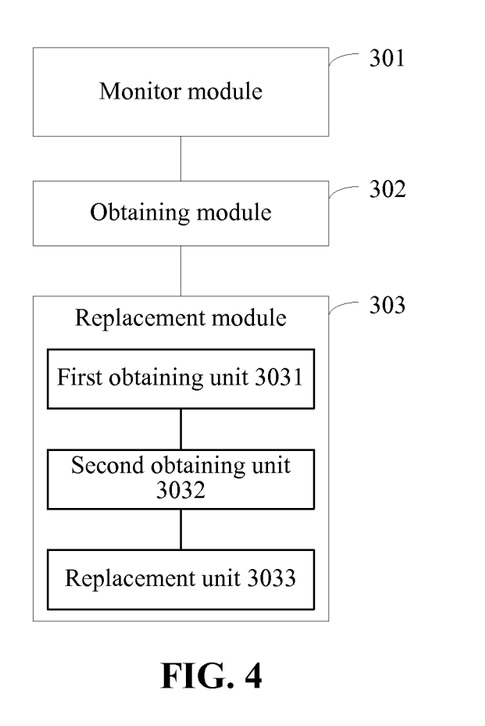
FIG. 4 is a schematic structural diagram of a second API (or a replacement function) interception device in accordance with some embodiments.

FIG. 4 is a schematic structural diagram of a second API (or a replacement function) interception device according to Embodiment 4 of the present invention.

The replacement module 303 includes:

a first obtaining unit 3031, configured to obtain, according to the class identifier, a class structure corresponding to a class, to which the first API belongs, from the virtual machine instance corresponding to the API process;

a second obtaining unit 3032, configured to obtain a function structure corresponding to the first API (or one of its functions) from the class structure according to a function identifier of the first API; and a replacement unit 3033, configured to replace the address of the first API that is stored in the function structure with the stored address of the function of the second API (or the replacement function).

In the embodiment of the present invention, the API process is monitored, according to the process identifier of the API process, in a virtual machine corresponding to an Android system in real time; if it is detected that the API process is activated, the virtual machine instance corresponding to the API process is obtained from the memory according to the process identifier of the API process; and according to identifier information of the first API, the address of the first API is replaced with the stored address corresponding to the second API (or the replacement function) from the virtual machine instance corresponding to the API process, so as to intercept the first API. In this way, the API process used to run a target application invokes and runs a code implementing the second API (or the replacement function) according to the replaced address, and the second API (or the replacement function) is used to implement a function of modifying or extending the target application, so as to modify or extend the function of the target application.

An embodiment of the present invention provides a mobile terminal, which includes the device in Embodiment 3.

Figure 5:
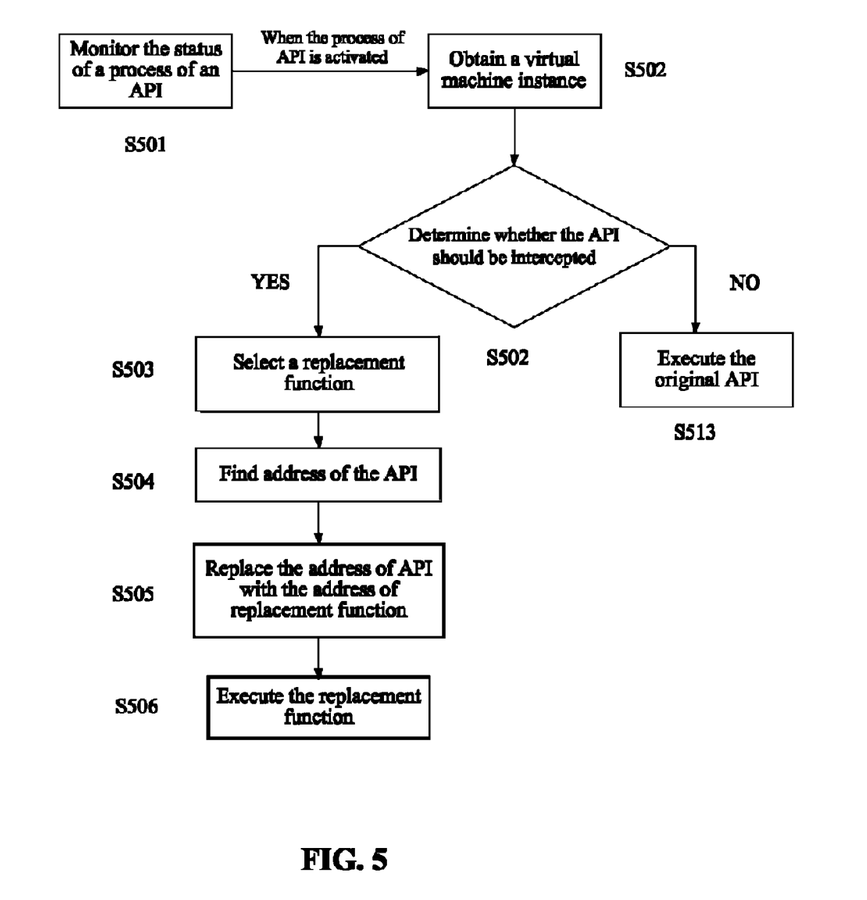
FIG. 5 is a flowchart of a method of API interception in accordance with some embodiments.

FIG. 5 is a flowchart of a method of API interception in accordance with some embodiments. The method may be performed in a computer, a handheld computing device or a handheld computer having one or more processors and memory storing one or more programs. One or more programs may be installed on the device, which, when executed by the one or more processors, cause the device to perform the method. A handheld computing device or a handheld computer can be any computing device fit to be held by a human hand. Nowadays popular handheld computing devices or handheld computers include smartphones. In some embodiments, the one or more programs are part of a security software application.

In step S501, a computer, a handheld computing device or a handheld computer monitors the status of a process of an API in a virtual machine based on a process identifier of the API.

In step S502, when the process of the API is activated, the device obtains a virtual machine instance corresponding to the API process from the memory based on the process identifier of the API.

In step S503, the device determines whether the API should be intercepted based on a first set of criteria stored in a database. The first set of criteria may include considerations regarding the registered information of a software application in the database, the API that is invoked in the software application, whether the software application has prior permission to call the API, etc. In some embodiments, the first set of criteria may include whether the registered information of the software application in the database is compatible with the API that is invoked in the software application. The registered information may include the type and purpose of the software, the authorization from the user related with the software, and prior history of the software. For example, if a software application registered as a weather service trying to call an API for email management without prior user authorization, the software may determine that the API should be intercepted. The database may include a virus database so that when an API is activated by a virus, the API is intercepted.

If the device determines that the API should not be intercepted, the API is subsequently executed without interruption.

If the device determines that the API or one of the functions of the API should be intercepted, select a replacement function based on second set of criteria stored in the database (step S503). The second set of criteria comprises considerations regarding the registered information of a software application in which the API is invoked, the behavior of the software and environment in which the software activates the API, etc. For example, when a telephone call API is activated by a user interaction application, the device may intercept the API and select a network telephone API function as replacement according to prior instruction of the user. When the API telephone call was made by a virus, the device may intercept the API and select a warning function to display a warning sign to the user.

In step S504, the device finds a first address where a function of the API is located from the virtual machine instance based on the process identifier of the API. The process of finding the first address comprises: obtaining a class structure of a class to which the API belongs from the virtual machine instance based on the class identifier; and obtaining a function structure of the function of the API based on the function identifier of the API. A more detailed description of the process can be found in paragraphs [0047]-[0054] and will not be repeated here.

In step S505, the device replaces the first address with a second address where the replacement function is located. In some embodiments, the API is written in a first computer language and the replacement function is written in a second computer language. For example, the first computer language is Java, and the API is written with Java method. The replacement function can be written with Native method, e.g., by C or C++ language.

In step S506, since the address of the function of the API is replaced with the address of the replacement function, the replacement function is executed.

Figure 6:
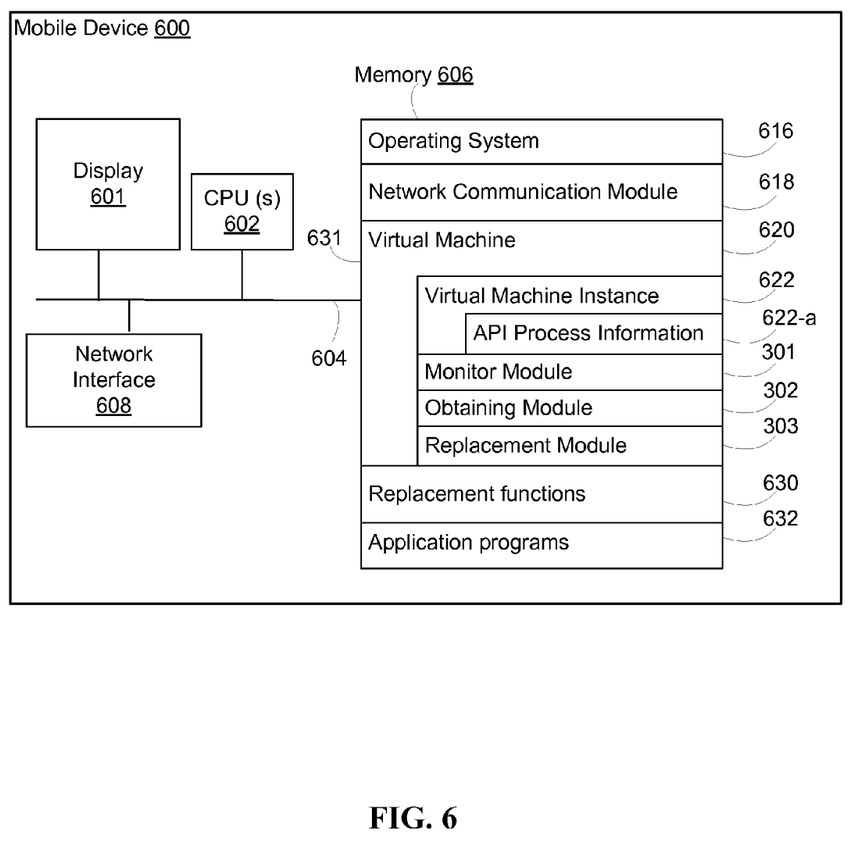
FIG. 6 is a diagram of an example implementation of a mobile computing device (e.g., a laptop or a smart phone) in accordance with some embodiments.

FIG. 6 is a diagram of an example implementation of a mobile computing device 602 (e.g., a laptop or a smart phone) in accordance with some embodiments. While certain specific features are illustrated, those skilled in the art will appreciate from the present disclosure that various other features have not been illustrated for the sake of brevity and so as not to obscure more pertinent aspects of the implementations disclosed herein. To that end, the mobile device 600 includes one or more processing units (CPU's) 602, one or more network or other communications interfaces 608, a display 601, memory 606, and one or more communication buses 604 for interconnecting these and various other components. The communication buses may include circuitry (sometimes called a chipset) that interconnects and controls communications between system components. The memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 606 may optionally include one or more storage devices remotely located from the CPU(s) 602. The memory 606, including the non-volatile and volatile memory device(s) within the memory 606, comprises a non-transitory computer readable storage medium.

In some implementations, the memory 606 or the non-transitory computer readable storage medium of the memory 606 stores the following programs, modules and data structures, or a subset thereof including an operating system 616, a network communication module 618, a virtual machine 620, one or more replacement function 630, and application programs 632.

The operating system 616 includes procedures for handling various basic system services and for performing hardware dependent tasks.

The network communication module 618 facilitates communication with other devices via the one or more communication network interfaces 608 (wired or wireless) and one or more communication networks, such as the internet, other wide area networks, local area networks, metropolitan area networks, and so on.

The virtual machine 620 includes a virtual machine instance 622 for each API process invoked by, e.g., one of the application programs 632, the virtual machine instance 622 further including information associated with the API process such as a process identifier. In some embodiments, the virtual machine 620 further includes a monitor module 301, an obtaining module 302, and a replacement module 303 as described above in connection with FIGS. 3 and 4. It would apparent to persons of ordinary skill in the art that any of the monitor module 301, the obtaining module 302, and the replacement module 303 may exist independently in the memory 606 but outside the virtual machine 620.

The replacement functions 630 are pre-generated for intercepting the processes associated with different application programs 632. Typically, they are written in a computer language different from the one used for writing the virtual machine instance 622. As described above, the virtual machine instance 622 is configured to invoke one of the replacement functions 630 based on examining the API process information 622-a associated with the virtual machine instance 622.

Persons of ordinary skill in the art may understand that, all or a part of the steps of the foregoing embodiments may be implemented through hardware, or may be implemented by a program instructing relevant hardware. The program may be stored in a computer readable storage medium. The storage medium may be a read-only memory, a magnetic disk, an optical disk, or the like.

The foregoing descriptions are merely exemplary embodiments of the present invention, but are not intended to limit the present invention. Any modification, equivalent replacement, or improvement made within the spirit and principle of the present invention shall fall within the protection scope of the present invention.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. An application programming interface (API) interception method performed at a mobile communication terminal having one or more processors and memory for storing one or more programs to be executed by the one or more processors, the method comprising:
    monitoring the status of a process of an API in a virtual machine based on a process identifier of the API;
    when the process of the API is activated, obtaining a virtual machine instance corresponding to the process of the API from the memory based on the process identifier of the API;
    identifying a first address of a function of the API in the virtual machine instance based on the process identifier of the API;
    replacing the first address with a second address of a replacement function, wherein the API is written in a first computer language and the replacement function is written in a second computer language; and
    executing the replacement function.

2. The method of claim 1, wherein monitoring the status of an API process in a virtual machine based on the process identifier of the API process comprises:
    detecting the activation of the API process upon detecting that the virtual machine starts executing a process associated with the process identifier.

3. The method of claim 1, wherein the process identifier of the API comprises a class identifier of a class to which the API belongs and a function identifier of the function of the API.

4. The method of claim 3, wherein identifying a first address of a function of the API in the virtual machine instance based on the process identifier of the API comprises:
    obtaining a class structure of a class to which the API belongs from the virtual machine instance based on the class identifier; and
    obtaining a function structure of the function of the API based on the function identifier of the function of the API.

5. The method of claims 4, wherein the first address is stored in the function structure of the function of the API.

6. The method of claim 1, wherein the second computer language is C or C++.

7. A mobile device, comprising:
    a processor;
    memory; and
    one or more programs stored in the memory and to be executed by the processor, the one or more programs including instructions for:
        monitoring the status of a process of an API in a virtual machine based on a process identifier of the API;
        when the process of the API is activated, obtaining a virtual machine instance corresponding to the process of the API from the memory based on the process identifier of the API;
        identifying a first address of a function of the API in the virtual machine instance based on the process identifier of the API;
        replacing the first address with a second address of a replacement function, wherein the API is written in a first computer language and the replacement function is written in a second computer language; and
        executing the replacement function.

8. The mobile device of claim 7, wherein monitoring the status of an API process in a virtual machine based on the process identifier of the API process comprises:
    detecting the activation of the API process upon detecting that the virtual machine starts executing a process associated with the process identifier.

9. The mobile device of claim 7, wherein the process identifier of the API comprises a class identifier of a class to which the API belongs and a function identifier of the function of the API.

10. The mobile device of claim 9, wherein identifying a first address of a function of the API in the virtual machine instance based on the process identifier of the API comprises:
    obtaining a class structure of a class that the API belongs from the virtual machine instance from the class identifier; and
    obtaining a function structure of the function of the API from the function identifier of the API.

11. The mobile device of claim 10, wherein the first address is stored in the function structure of the function of the API.

12. The mobile device of claim 7, wherein the second computer language is C or C++.

13. A handheld computer, comprising:
    one or more processors; and
    memory storing one or more programs, wherein the one or more programs, when executed by the one or processors, cause the handheld computer to:
        monitor the status of a process of an API in a virtual machine based on a process identifier of the API;
        when the process of the API is activated, obtain a virtual machine instance corresponding to the API process from the memory based on the process identifier of the API;
        determine whether the API should be intercepted based on a first set of criteria stored in a database;
        if the API should be intercepted, select a replacement function based on a second set of criteria stored in the database;

identify a first address of a function of the API in the virtual machine instance based on the process identifier of the API;

replace the first address with a second address of a replacement function, wherein the API is written in a first computer language and the replacement function is written in a second computer language; and execute the replacement function.

14. A handheld computer of claim 13, wherein the one or more programs are part of a computer security software application.

15. A handheld computer of claim 13, wherein the database includes a virus database.

16. A handheld computer of claim 13, wherein the first set of criteria comprises whether registered information of a software application in the database is compatible with the API that is invoked in the software application.

17. A handheld computer of claim 13, wherein the second set of criteria comprises the registered information of a software application in which the API is invoked.

18. The handheld computer of claim 13, wherein the process identifier of the API comprises a class identifier of a class to which the API belongs and a function identifier of the function of the API.

19. The handheld computer of claim 18, wherein identifying the first address of the function of the API in the virtual machine instance based on the process identifier of the API comprises:

obtaining a class structure of the class that the API belongs from the virtual machine instance from the class identifier; and obtaining a function structure of the function of the API from the function identifier of the API.

20. The handheld computer of claim 19, wherein the first address is stored in the function structure of the function of the API.

\* \* \* \* \*